United States Patent
Buelow

[15] 3,704,896
[45] Dec. 5, 1972

[54] AUXILIARY STEERABLE WHEELS FOR VEHICLES

[72] Inventor: William H. Buelow, Brookfield, Wis.

[73] Assignee: Rex Chainbelt Inc., Milwaukee, Wis.

[22] Filed: May 7, 1969

[21] Appl. No.: 829,155

[52] U.S. Cl............280/81 A, 280/43.23, 280/124 F, 280/150 A
[51] Int. Cl. .............................................B62d 61/12
[58] Field of Search......280/81, 124 F, 43.23, 150 A; 267/34, 65; 180/24.02

[56] References Cited

UNITED STATES PATENTS

| | | | |
|---|---|---|---|
| 3,093,388 | 6/1963 | Kulyk | 267/34 |
| 2,988,375 | 6/1961 | Lich | 280/124 |
| 2,988,378 | 6/1961 | Davies | 280/124 |
| 3,246,913 | 5/1966 | Darling | 280/81 |
| 2,974,976 | 3/1961 | Lyall | 280/124 |
| 3,403,925 | 10/1968 | Sauer | 280/81 |
| 2,847,228 | 8/1958 | Hall | 280/81 |
| 2,912,250 | 11/1959 | Fresia | 280/81 |
| 3,112,100 | 11/1963 | Prichard | 280/81 |
| 3,390,895 | 7/1968 | Verdi | 180/24.02 |
| 3,520,549 | 7/1970 | DeLay | 280/81 |

*Primary Examiner*—Kenneth H. Betts
*Attorney*—Ernst W. Schultz and Edward W. Mentzer

[57] ABSTRACT

A truck mixer, having a concentrated load and including conventional forward steering wheels and rear drive wheels, is provided with additional wheels on an auxiliary axle below the frame of the truck. A contained fluid at a preselected constant pressure determines the auxiliary support of the truck on said axle to provide the desired distribution of the truck load in a known manner. The wheels are castered for following the forward directions of the truck. Fluid pressure means provides for raising the axle when the wheels are not in use.

6 Claims, 7 Drawing Figures

PATENTED DEC 5 1972

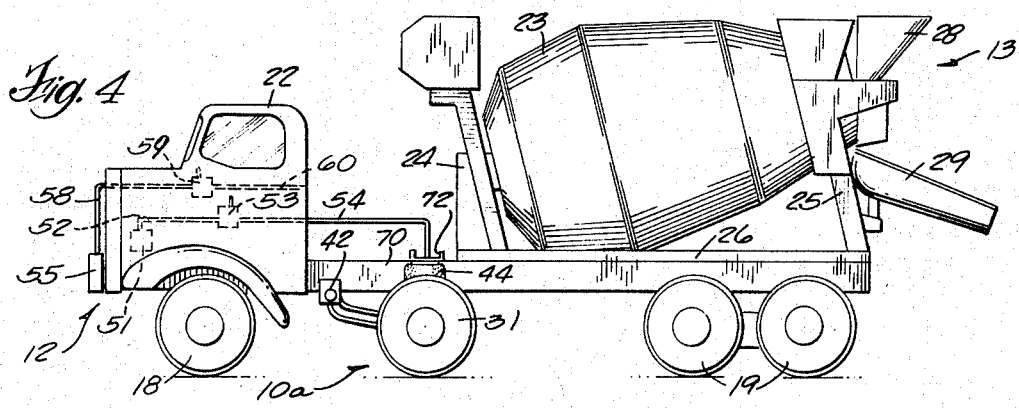
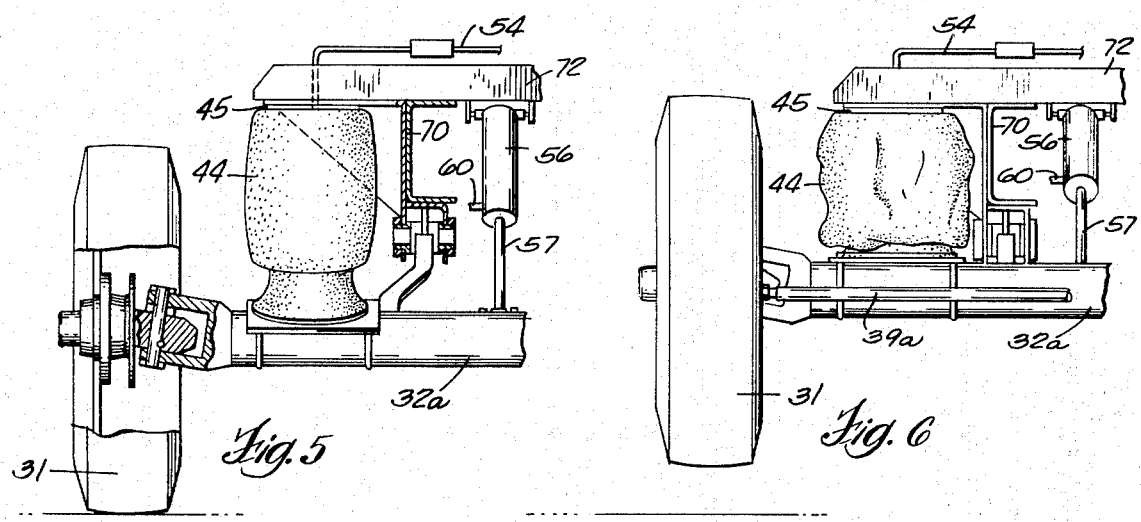
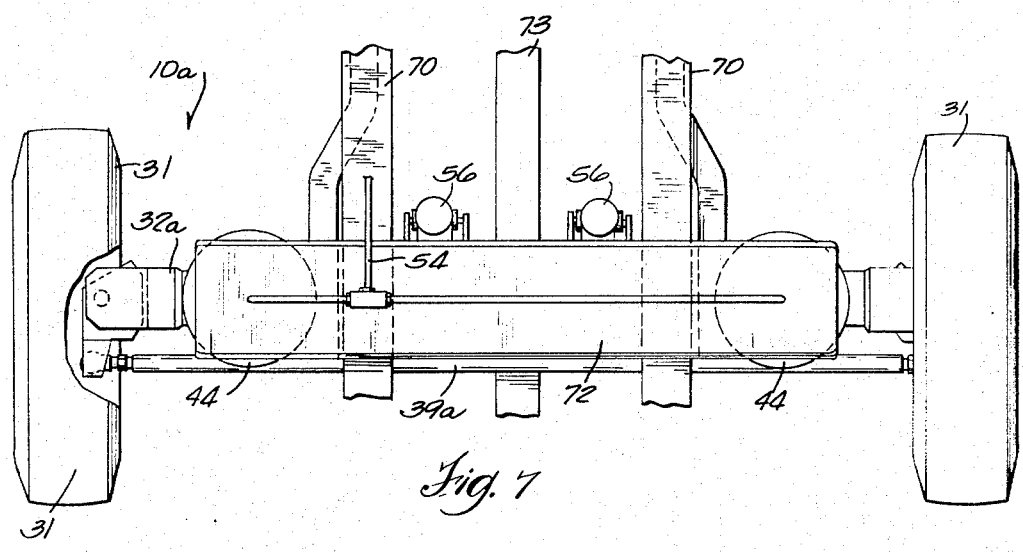

3,704,896

AUXILIARY STEERABLE WHEELS FOR VEHICLES

BACKGROUND OF THE INVENTION

The development of what is called an air-bag suspension which provides a near constant downward force on the auxiliary axle of trucks has made such axles especially practicable. These air-bags are placed between the two longitudinal members of the truck frame and the axle and are pressurized from the supply of air with which the truck is regularly provided.

The air-bags are pressurized only when the truck is loaded and the regular wheels of the truck otherwise would be illegally overloaded. When the truck is not loaded, the air-bags are not pressurized and the wheels may merely contact the ground. However, means for raising the auxiliary wheels when not in use is also available. By raising the auxiliary wheels the wear of the tires of these wheels is reduced.

The auxiliary axle is generally installed just ahead of or behind the regular drive wheels of the truck which are usually in tandem. Auxiliary wheels which are disposed behind the regular tandem drive wheels shift rearwardly the effective axis of the drive wheels and this shifting increases the turning radius of the truck.

In some instances applicable weight laws require the auxiliary wheels to be spaced some distance from the rear wheels. With such spacing the wear of the tires of the auxiliary wheels is considerable because of the severe tire scuffing which occurs while the truck is cornering. Also, when such spacing is considerable, the auxiliary wheels presently available cannot be raised sufficiently. Such wheels when raised to the extent allowed will contact high ground areas and lift the vehicle so that the steering or the regular drive wheels may be ineffective because they are not in firm contact with the ground.

SUMMARY OF THE INVENTION

The present invention overcomes the described limitations of the prior art. An auxiliary axle assembly is provided which has wheels which are dirigible; that is, the wheels of the assembly are steerable. In the preferred form of the invention the wheels are castered to follow the forward movement of the truck. Such assembly is thus elevatable so that the wheels are well above the ground whereby the truck may move forwardly and in reverse over very uneven terraine. Pressurized devices such as air-bags are placed alongside or the rear of the longitudinal frame members of the vehicle so that the wheels may be raised substantially higher than heretofore allowed by the construction of the prior art described.

BRIEF DESCRIPTION OF THE DRAWINGS

FIG. 4 is a side elevation of a truck mixer embodying the present invention with the auxiliary axle intermediate the forward steering wheels and the rear drive wheels of the truck.

FIG. 5 is a rear elevation of the left side of the auxiliary axle and supporting structure which is attached to the truck frame. The left channel of the truck frame is shown in section.

FIG. 6 is a view similar to FIG. 5 and shows the wheel elevated.

FIG. 7 is a plan view of the auxiliary axle and portions of the truck frame shown in FIGS. 4, 5 and 6.

DESCRIPTION OF THE PREFERRED EMBODIMENT

Figure 1:
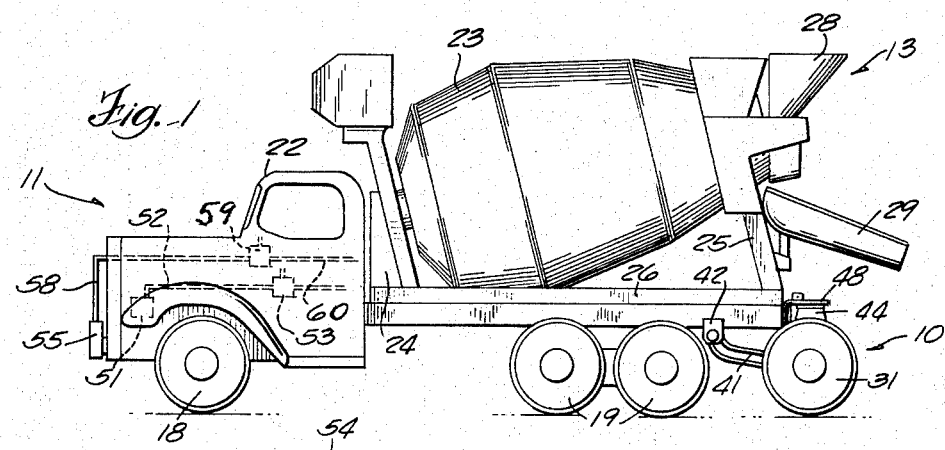
FIG. 1 is a side elevation of the truck mixer embodying the present invention with the auxiliary axle located at the rear of the truck.
Figure 2:
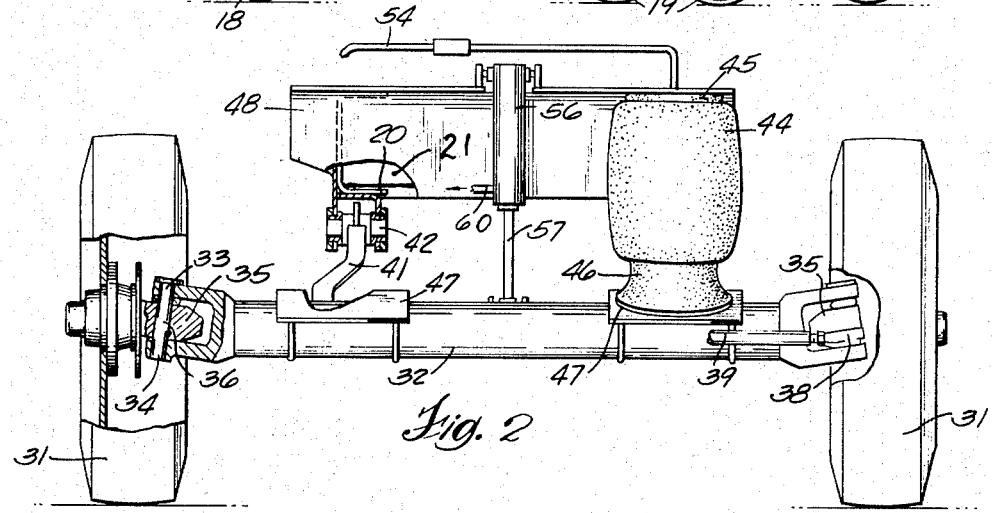
FIG. 2 is an enlarged rear elevation of the lower part of the truck shown in FIG. 1 with parts broken away and in section.
Figure 3:
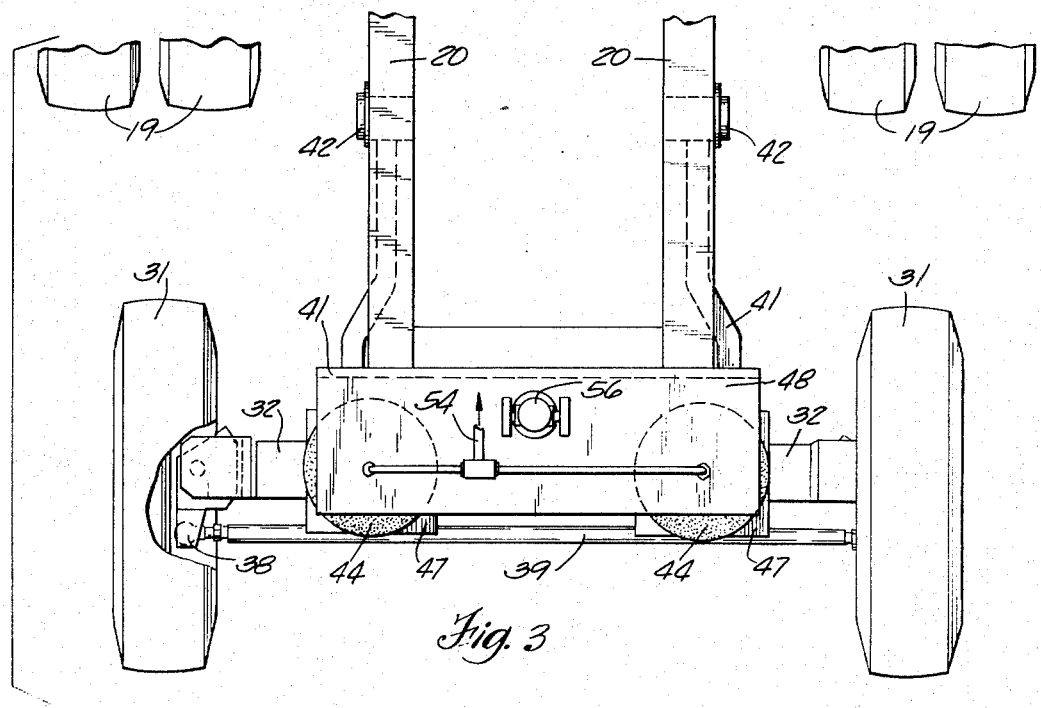
FIG. 3 is a plan view of the parts of the rear truck suspension shown in FIG. 2 and includes portions of the rearmost wheels of the truck.

The auxiliary axle assembly 10 of the present invention is shown as it may be employed at the rear of the truck 11 or intermediate the wheels of the truck 12. The trucks carry identical concrete mixers 13.

Truck 11 includes the forward steering wheels 18 which are or may be driven. The rear dual wheels 19 support conventional tandem axes which are connected at each side of the truck by suspension means which equalize the load applied thereto by each frame member of the truck.

The frame members shown comprise the usual inwardly facing channels 20 which with cross-braces and the rear cross member 21 form the truck frame.

The mixer 13 as shown in FIG. 1 is mounted on the truck frame immediately behind the operator's cab 22. The mixer includes the drum 23 which is supported for rotation on the front and rear supports 24 and 25. These supports are joined by longitudinal members 26 which rest directly on the upper sides of channels 20 and are secured by means of suitable bolts not shown. The concrete ingredients are delivered to drum 23 through the hopper 28 carried by support 25 as drum 23 rotates in one direction. Rotation of drum 23 in the other direction discharges the mixed concrete into the extensible inclined chute 29 which is pivotally supported by the rear support 25.

The auxiliary axle assembly 10 of the present invention includes the wheels 31 and the rigid axle 32 which is provided at each end with the upper and lower kingpin bearings 33 and 34. Each wheel 31 is rotatably supported on a spindle which is attached to or part of the steering knuckle 35. The king pin 36 of each knuckle is turnable in the respective bearings and further includes a rearwardly extending steering arm 38. The steering arms 38 of the two knuckles are universally connected to the ends of the adjustable tie rod 39.

The projected axis of each king pin 36 intersects the ground forwardly of the point of contact of the respective wheel 31 so that both wheels are castered and in effect will turn on their kingpin axes to follow changes in the forward direction of the truck. Additionally, the steering geometry of the steering arms with the tie rods is such that the turning radii of the two wheels and of the other wheels of the truck have a common center.

Axle 32 and the forward arms 41 extending forwardly therefrom are of rigid construction. The forward end of each arm 41 is pivotally connected to the bracket 42, located immediately beneath the lower flange of the corresponding channel 20. Each bracket 42 includes a flat portion or plate which adjoins and is riveted to the center section of the channel for securement thereto.

The auxiliary axle assembly 10 in its preferred embodiment includes the two flexible, airtight bags 44 which are fitted with metal upper ends 45 and have lower ends fitting over the contoured pistons 46 in the usual manner. Each piston 46 is mounted on a plate 47 which is secured to axle 32.

The upper ends 45 of air bags 44 are carried by the bracket 48 which is secured to the rear frame or channels 20 of truck 11. Bracket 48 may be of any suitable construction, the bracket 48 shown being for illustrative purposes only. As such, bracket 48 has a lower vertical section which is bolted and welded to the rear cross-member 21 of truck 11, and an upper horizontal section to which the upper ends 45 of air bags 44 are directly attached.

The conventional air supply of the truck may be used to pressurize air bags 44. For that purpose, the engine driven air compressor 51 is connected by line 52 to the manually adjustable air control valve 53 which is located in the cab of the truck where it can be adjusted by the truck operator. The line 54 connects valve 53 and the upper ends 45 of air bags 44 whereby the pressure in the bags applies a downward force on axle 32 and a corresponding lifting force on bracket 48 which provides the preselected auxiliary support of the rear of truck 11. This force is generally constant, depending upon the degree of air pressure regulation which is maintained by any of several known means.

It should be noted that air bags 45 are not located beneath channels 20 of the truck 11 (or truck 12) as is conventional. They are longer or higher than conventional air bags and, as shown, they extend alongside the truck channels at least to the upper elevation of the channels in particular so that axle assembly 10 may be raised to a position with axle 32 extending immediately beneath the channels.

The air supply provided by pump 51 may also be used to elevate axle 32. The truck 11 shown includes an engine-driven fluid pump 55 at the front of the truck which drives the fluid motor, not shown, which turns drum 23 of mixer 13. This supply of hydraulic pressure is more convenient, in some respects for elevating axle 32.

For that purpose, the hydraulic cylinder 56 between air bags 44 is connected at its upper end to bracket 48 and the lower end of the actuating rod 57 is connected to axle 32. The hydraulic pressure supply line 58 connects pump 55 with the manually controlled valve 59 which is also located in the operator's cab of truck 11 and line 60 connects valve 59 and cylinder 56 for raising axle 32 and wheels 31 when desired.

In particular, axle 32 is raised when the truck is unloaded and also when the truck must move backward such that the castered wheels 31 would interfere with such movement.

The axle assembly 10a shown in FIGS. 4–6 in connection with truck 12 is similar to axle assembly 10 except that the air bags 44 are further apart, being alongside frame channels 70 of truck 12. Axle 32a and tie rod 39a are correspondingly longer whereby wheels 31 of assembly 10a are farther apart to be clear of bags 44.

Truck 12, as shown, and by comparison with truck 11, is of a longer wheelbase between wheels 18 and 19 and has a shorter, higher cab.

Brackets 42 are secured to channels 70 of truck 12 behind the operator's cab and the upper ends 45 of air bags 44 are secured to the underside of the projecting ends of the cross-channel member 72. Member 72 is secured to channels 70 and extends crosswise thereover just ahead of the front support 24 of mixer 13.

Air bags 44 are pressurized by air supplied by the engine-driven pump 51 through line 52, valve 53 and lines 54 connected to the upper ends 45 of bags 44. Depending upon the pressure applied to bags 44 of truck 12, wheels 31 provide auxiliary support of the truck as required. The position of wheels 31 between wheels 18 and 19 of the truck and nearer wheels 18 is such that wheels 18 are relieved of somewhat more of the weight of the truck than are wheels 19.

Because of the drive-line 73 of the truck 12 which extends from the truck engine to the tandem axles of wheels 19 it may be necessary to provide axle 32a and the rod 39a with a "dropped center" configuration so that the wheels 31 may be elevated as with hydraulic cylinders 56.

Axle 32a and wheels 31 must be raised when truck 12 moves in the reverse direction and, as with truck 11, when truck 12 is operating without a load, the auxiliary axle assembly is not required and may be raised to avoid unnecessary wear of the tires of wheels 31.

Also because of drive line 73, two cylinders 56 may be used to elevate axle 32a and are located on either side of drive line 73 between channels 70. The upper ends of cylinders 56 are connected to member 72 and the lower ends of rods 57 are connected to axle 32a.

Cylinders 56 are operated by fluid pressure supplied by pump 55 through line 58, valve 59, and the lines 60 connected to the lower ends of cylinders 56.

According to the present invention, wheels 31 are castered but may also or instead be positively steered with power means in a known manner. Although castered wheels and steered wheels are known, the importance or desirability of castering or steering has been overlooked in connection with auxiliary axle assemblies which are attached to the truck and are not a regular or integral part of the forward or rear suspension system of the truck.

As is known, the effective axis of rear wheels 19 and the axes of wheels 18 intersect at a common point when wheels 18 are turned for steering and the intersection determines the turning radius of the truck. When a truck is provided with an auxiliary axle and wheels, the effective axis of the regular rear wheels of the truck is moved forwardly or rearwardly depending upon whether the auxiliary axis is forwardly or rearwardly thereof.

According to the present invention, by allowing the wheels to caster, this effect is eliminated.

What I claim is:

1. A truck having a frame including spaced longitudinal members and a rear connecting cross member, forward steerable and rear drive wheels directly supporting said frame members, an auxiliary axle assembly connected to said frame members for relative vertical movement and including an axle which extends transversely of and below the truck frame and fluid pressure suspension means carried by said axle; each end of said axle having a kingpin and a support wheel mounted on said kingpin for dirigible movement, the projected axis of each kingpin being forwardly disposed of the ground engagement area of the respective wheel, said wheels being dirigible and having means connecting the two wheels so that they steer together, the variable fluid pressure suspension means being alongside the frame whereby the axle may be raised fully to an elevation immediately beneath said frame, said suspension means comprising at least one rigid bracket secured and projecting from the truck frame near or above the upper dimensions thereof and over the auxiliary axle assembly, vertically expansible fluid pressure cylinder and piston means interposed between each bracket and said axle assembly and alongside the truck frame, manually controllable fluid pressure supply means connected to said cylinder means to pressurize the same for the selected support of the truck frame at the location of said brackets, and manually controlled means for relieving the pressure of said supply means and for raising said axle to said elevated position.

2. The invention of claim 1 wherein said auxiliary axle and the wheels thereof are located ahead of the rear drive wheels of the truck and the brackets comprise the ends of a beam extending transversely over the truck frame.

3. The invention of claim 1 wherein said auxiliary axle and the wheels thereof are located at the rear of the truck frame and said brackets together comprise an elevated rearward extension of the truck frame.

4. The invention of claim 1 wherein the auxiliary axle is connected to the frame by arms having upper forward ends pivotally connected to the longitudinal frame members and lower rear ends joined to the connecting axle.

5. The invention of claim 1 wherein the piston and cylinder means comprise flexible air-tight extensible bags having upper ends secured to the undersides of said brackets and lower ends secured to the auxiliary axle.

6. The invention of claim 1 wherein the piston and cylinder means comprise rigid pistons secured to and projecting upwardly from the auxiliary axle and the cylinders comprise flexible air-tight bags having upper ends secured to the undersides of said brackets and lower ends variably fitting over said pistons.

* * * * *